United States Patent
Yang (10) Patent No.: US 12,436,266 B2
(45) Date of Patent: Oct. 7, 2025

(54) VEHICLE SENSOR FUSION APPARATUS AND METHOD THEREOF

(71) Applicant: HYUNDAI MOBIS Co., Ltd., Seoul (KR)

(72) Inventor: Jin Ho Yang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 614 days.

(21) Appl. No.: 17/879,044

(22) Filed: Aug. 2, 2022

(65) Prior Publication Data

US 2023/0176204 A1 Jun. 8, 2023

(30) Foreign Application Priority Data

Dec. 2, 2021 (KR) .................. 10-2021-0170697

(51) Int. Cl.
| G01S 13/86 | (2006.01) |
| G01S 13/89 | (2006.01) |
| G01S 13/931 | (2020.01) |
| G01S 17/89 | (2020.01) |
| G01S 17/931 | (2020.01) |

(52) U.S. Cl.
CPC .......... *G01S 13/865* (2013.01); *G01S 13/89* (2013.01); *G01S 13/931* (2013.01); *G01S 17/89* (2013.01); *G01S 17/931* (2020.01)

(58) Field of Classification Search
CPC .... G01S 13/865; G01S 13/867; G01S 13/931; G01S 17/931
See application file for complete search history.

(56) References Cited

U.S. PATENT DOCUMENTS

| 9,007,197 | B2 * | 4/2015 | Breed ................ G01S 19/41 340/436 |
| 11,733,386 | B2 * | 8/2023 | Banerjee ............ G01S 13/865 342/54 |
| 12,012,114 | B2 * | 6/2024 | Ji ...................... G01S 13/931 |
| 2010/0235129 | A1 * | 9/2010 | Sharma .............. G01S 17/86 702/97 |
| 2018/0113209 | A1 * | 4/2018 | Campbell ........... G01S 13/86 |
| 2018/0126984 | A1 * | 5/2018 | Liu .................... B60W 10/18 |
| 2018/0361854 | A1 * | 12/2018 | Chiba ................ G01S 13/931 |
| 2021/0103027 | A1 * | 4/2021 | Harrison ............ G01S 7/40 |
| 2021/0241026 | A1 * | 8/2021 | Deng ................. G01S 7/497 |
| 2021/0263154 | A1 * | 8/2021 | Herman ............. G01S 17/26 |
| 2021/0278523 | A1 * | 9/2021 | Urtasun ............. G01S 7/417 |
| 2021/0333387 | A1 * | 10/2021 | Hiroi ................. G01S 17/89 |
| 2022/0018951 | A1 * | 1/2022 | Kim .................. G01S 13/867 |
| 2022/0055652 | A1 * | 2/2022 | Lee .................... G01S 17/89 |
| 2022/0357441 | A1 * | 11/2022 | Ansari ............... G01S 13/867 |
| 2022/0398851 | A1 * | 12/2022 | Nehmadi ........... G01S 17/931 |
| 2023/0150518 | A1 * | 5/2023 | Zhao ................. G01S 17/42 701/1 |

* cited by examiner

*Primary Examiner* — Peter M Bythrow
(74) *Attorney, Agent, or Firm* — MORGAN, LEWIS & BOCKIUS LLP (57) ABSTRACT

A vehicle sensor fusion apparatus and a method thereof are provided. The vehicle sensor fusion apparatus includes a plurality of sensors that output point cloud-based sensing results, a fusion determination device that determines whether it is possible to fuse the sensing results based on the sensing results output from the plurality of sensors, and a sensing result fusion device that fuses and outputs the sensing results, when it is determined that it is possible to fuse the sensing results.

15 Claims, 5 Drawing Sheets

VEHICLE SENSOR FUSION APPARATUS AND METHOD THEREOF

CROSS-REFERENCE TO RELATED APPLICATION

This application claims the benefit of priority to Korean Patent Application No. 10-2021-0170697, filed in the Korean Intellectual Property Office on Dec. 2, 2021, the entire contents of which are incorporated herein by reference.

TECHNICAL FIELD

The present disclosure relates to a vehicle sensor fusion apparatus and a method thereof, and more particularly, relates to a vehicle sensor fusion apparatus for fusing pieces of sensing data obtained by a plurality of sensors installed in a vehicle and a method thereof.

BACKGROUND

An autonomous vehicle refers to a vehicle capable of recognizing surrounding environments and determining a driving route to independently travel. For example, the autonomous vehicle may prevent a collision with an obstacle which is present on a driving route, although a driver does not manipulate a steering wheel, an accelerator pedal, a brake, or the like, and may drive on its own to its destination while adjusting a vehicle speed and a driving direction depending on a shape of the road.

The autonomous vehicle is configured to detect an object which is present around the vehicle by means of sensors mounted on the autonomous vehicle and analyze the detected object to use it to control driving of the vehicle.

There is a need for more accurate object information to develop a safer autonomous vehicle. A technology for fusing pieces of information obtained from the sensors mounted on the vehicle has been developed to obtain more accurate object information.

SUMMARY

The present disclosure has been made to solve the above-mentioned problems occurring in the prior art while advantages achieved by the prior art are maintained intact.

An aspect of the present disclosure provides a vehicle sensor fusion apparatus for fusing point cloud-based object sensing results and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle sensor fusion apparatus may include a plurality of sensors that outputs point cloud-based sensing results, a fusion determination device that determines whether it is possible to fuse the sensing results based on the sensing results, and a sensing result fusion device that fuses the sensing results and outputs the fused sensing results, when it is determined that it is possible to fuse the sensing results.

In an embodiment, the fusion determination device may extract points located at predetermined locations from points included in sensing result of each of the plurality of sensors and determine whether it is possible to fuse the sensing results based on coordinates of the extracted points.

In an embodiment, the fusion determination device may calculate distances between the extracted points and inner angles of a shape estimated by the extracted points based on the coordinates of the extracted points, may determine whether a first fusion condition is met based on the calculated distances, and may determine whether a second fusion condition is met based on the calculated inner angles.

In an embodiment, the fusion determination device may determine that it is possible to fuse the sensing results, when it is determined that at least one of the first fusion condition and the second fusion condition is met.

In an embodiment, the fusion determination device may determine that it is impossible to fuse the sensing results, when it is determined that both the first fusion condition and the second fusion condition are not met.

In an embodiment, the fusion determination device may include a point cloud determination device that determines whether the sensing results are results of sensing the same object, an extraction device that extracts a leftmost point with respect to a width of a host vehicle, a rightmost point with respect to the width of the host vehicle, and a point of a location closest to the host vehicle from the points included in the sensing results, when the sensing results are the results of sensing the same object, a first fusion possible determination calculation device configured to calculate distances between the points extracted by the extraction device and determine whether the first fusion condition is met based on the calculated distances, a second fusion possible determination calculation device that calculates inner angles of a shape estimated by the points extracted by the extraction device and determine whether the second fusion condition is met based on the calculated inner angles, and a fusion controller that determines whether it is impossible to fuse the sensing results, whether the first fusion condition is met and whether the second fusion condition is met.

In an embodiment, the first fusion possible determination calculation device may calculate the distances between the points extracted by the extraction device, assigns weights to the calculated distances, and may determine that the first fusion condition is met, when a sum of the calculated distances to which the weights are assigned is less than a predetermined distance threshold.

In an embodiment, the first fusion possible determination calculation device may change the weights depending on a direction of motion of the same object, when assigning the weights to the calculated distance.

In an embodiment, the second fusion possible determination calculation device may calculate inner angles of an L-shape based on coordinates of the points extracted by the extraction device, when the shape estimated from the points extracted by the extraction device is the L-shape, may assign a weight to a difference between the calculated inner angles, and may determine that the second fusion condition is met, when the difference to which the weight is assigned is less than a predetermined direction angle threshold.

According to an aspect of the present disclosure, a vehicle sensor fusion method may include determining, by a point cloud determination device, whether a sensing result of a radar sensor and a sensing result of a light detection and ranging (LiDAR) sensor are results of sensing the same object, extracting, by an extraction device, points of predetermined locations from the sensing result of the radar sensor and from the sensing result of the LiDAR sensor, when it is determined that the sensing result of the radar sensor and the sensing result of the LiDAR sensor are the results of sensing the same object, determining, by a first fusion possible determination calculation device, whether a first fusion condition is met based on the points extracted from each of the sensing results of the radar sensor and the LiDAR sensor, determining, by a second fusion possible determination calculation device, whether a second fusion condition is met based on the points extracted from each of the sensing results of the radar sensor and the LiDAR sensor, and determining, by a fusion controller, whether to fuse the sensing result of the radar sensor with the sensing result of the LiDAR sensor based on whether the first and second fusion conditions are met.

In another embodiment, the extracting of the points may include extracting, by the extraction device, a leftmost point with respect to a width of a host vehicle, a rightmost point with respect to the width of the host vehicle, and a point located at a location closest to the host vehicle from the sensing result of the radar sensor and extracting, by the extraction device, a leftmost point with respect to the width of a host vehicle, a rightmost point with respect to the width of the host vehicle, and a point located at a location closest to the host vehicle from the sensing result of the LiDAR sensor.

In another embodiment, the determining of whether the first fusion condition is met may include calculating, by the first fusion possible determination calculation device, a distance between the leftmost point with respect to the width of the host vehicle in the sensing result of the radar sensor and the leftmost point with respect to the width of the host vehicle in the sensing result of the LiDAR sensor and assigning a first weight to the calculated distance, calculating, by the first fusion possible determination calculation device, a distance between the rightmost point with respect to the width of the host vehicle in the sensing result of the radar sensor and the rightmost point with respect to the width of the host vehicle in the sensing result of the LiDAR sensor and assigning a second weight to the calculated distance, calculating, by the first fusion possible determination calculation device, a distance between the point located at the location closest to the host vehicle in the sensing result of the radar sensor and the point located at the location closest to the host vehicle in the sensing result of the LiDAR sensor and assigning a third weight to the calculated distance, and determining that the first fusion condition is met, when a sum of the calculated distances to which the first to third weights are assigned is less than a predetermined distance threshold.

In another embodiment, the determining of whether the first fusion condition is met further may include changing, by the first fusion possible determination calculation device, one of the first to third weights based on a movement direction of the same object.

In another embodiment, the changing of the one of the first to third weights may be to change the first weight among the first to third weights to the largest value, when the same object moves from the right to the left with respect to the host vehicle.

In another embodiment, the changing of the one of the first to third weights may be to change the second weight among the first to third weights to the largest value, when the same object moves from the left to the right with respect to the host vehicle.

In another embodiment, the determining of whether the second fusion condition is met may include calculating, by the second fusion possible determination calculation device, an inner angle of an L-shape estimated from the leftmost point, the rightmost point, and the point located at the location closest to the host vehicle, the points being extracted from the sensing result of the radar sensor, calculating, by the second fusion possible determination calculation device, an inner angle of an L-shape estimated from the leftmost point, the rightmost point, and the point located at the location closest to the host vehicle, the points being extracted from the sensing result of the LiDAR sensor, and assigning a weight to a difference between the inner angle calculated from the sensing result of the radar sensor and the inner angle calculated from the sensing result of the LiDAR sensor and determining that the second fusion condition is met when the difference to which the weight is assigned is less than a predetermined direction angle threshold.

In another embodiment, the determining of whether to fuse the sensing result of the radar sensor with the sensing result of the LiDAR sensor may include fusing, by the fusion controller, the sensing result of the radar sensor with the sensing result of the LiDAR sensor, when it is determined that at least one of the first fusion condition and the second fusion condition is met.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the accompanying drawings. In adding the reference numerals to the components of each drawing, it should be noted that the identical component is designated by the identical numerals even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the corresponding components. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 5.

Figure 1:
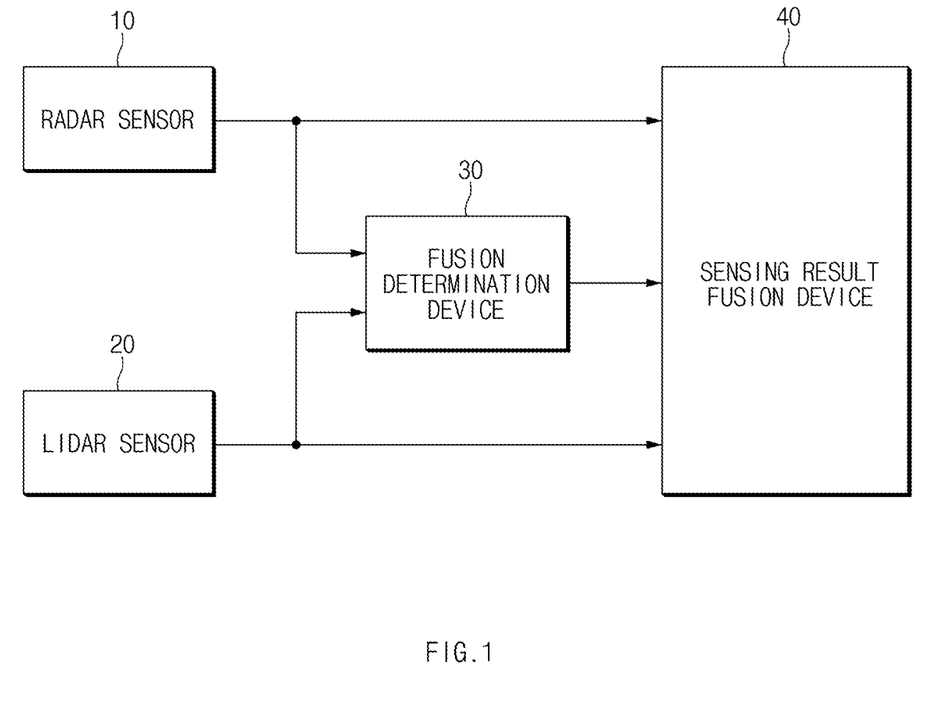
FIG. 1 is a block diagram illustrating a configuration of a vehicle sensor fusion apparatus according to an embodiment of the present disclosure.

FIG. 1 is a block diagram illustrating a configuration of a vehicle sensor fusion apparatus according to an embodiment of the present disclosure.

Referring to FIG. 1, the vehicle sensor fusion apparatus according to an embodiment of the present disclosure may include a radar sensor 10, a light detection and ranging (LiDAR) sensor 20, a fusion determination device 30, and a sensing result fusion device 40.

In this case, the radar sensor 10 and the LiDAR sensor 20 are only described as an example to describe an apparatus for fusing sensing results of sensors capable of obtaining point cloud-based sensing results, but the vehicle sensor fusion apparatus according to an embodiment of the present disclosure is not limited thereto.

The radar sensor 10 may be a sensor for measuring a distance from an object, a direction of the object, and a speed of the object using a radio wave.

The LiDAR sensor 20 may be a sensor for measuring a distance from an object, a direction of the object, and a speed of the object using a laser.

The fusion determination device 30 may determine whether to activate the sensing result fusion device 40 according to sensing results output from the radar sensor 10 and/or the LiDAR sensor 20 and may activate or deactivate the sensing result fusion device 40.

For example, the fusion determination device 30 may determine reliability when fusing sensing results based on the sensing results output from the radar sensor 10 and the LiDAR sensor 20 and may determine whether to activate the sensing result fusion device 40 based on the determined reliability.

When the sensing result fusion device 40 is activated by the fusion determination device 30, it may fuse the sensing results obtained from the radar sensor 10 and the LiDAR sensor 20.

At this time, when fusing and outputting the sensing results of the radar sensor 10 and the LiDAR sensor 20, the sensing result fusion device 40 may output the fused sensing result and information about the reliability of the fused sensing result.

Meanwhile, when the sensing result fusion device 40 is deactivated by the fusion determination device 30, it may end the operation of fusing the sensing results obtained from the radar sensor 10 and the LiDAR sensor 20.

Figure 2:
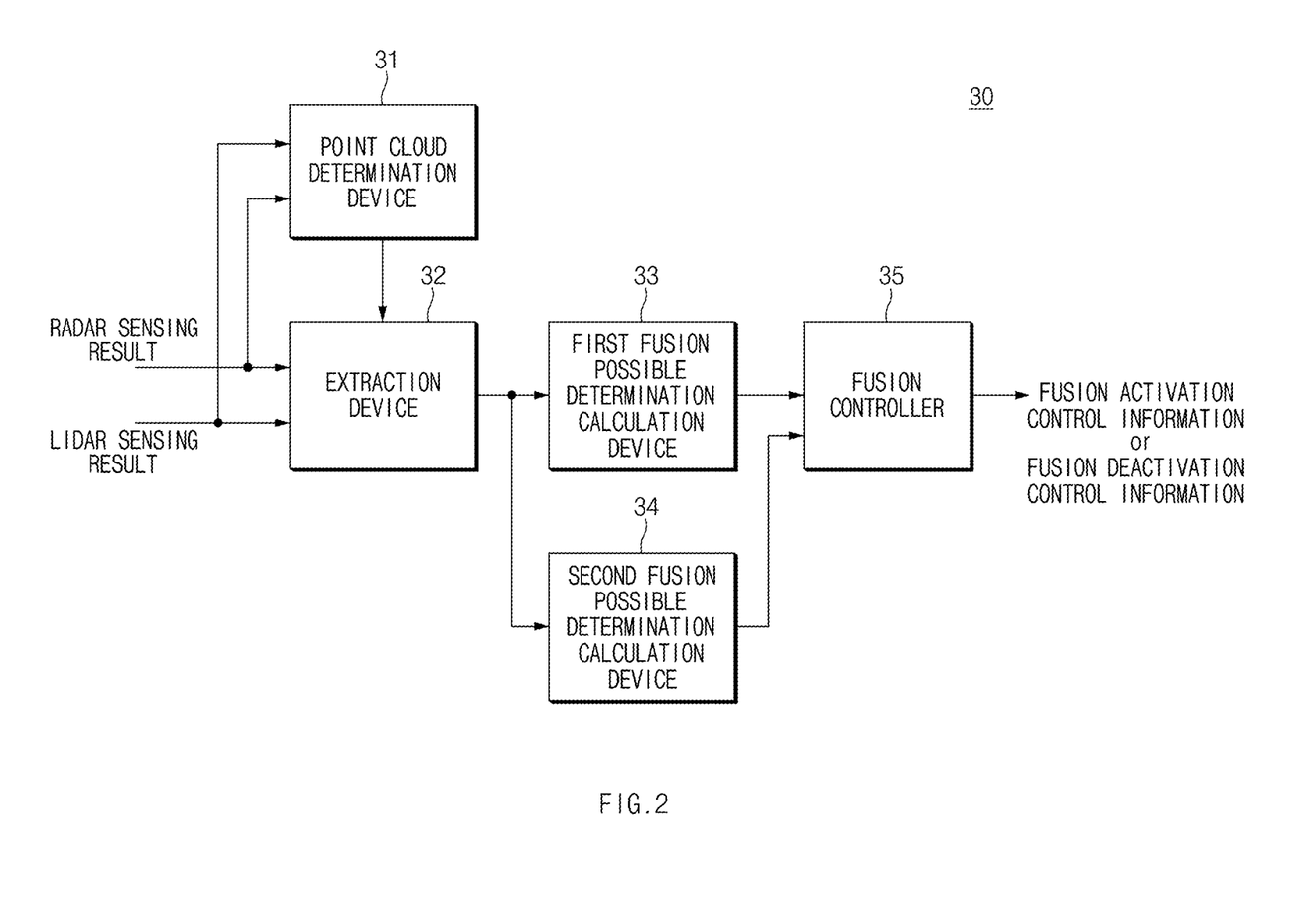
FIG. 2 is a drawing illustrating a configuration of a fusion determination device making up a vehicle sensor fusion apparatus according to an embodiment of the present disclosure.

FIG. 2 is a drawing illustrating a configuration of a fusion determination device making up a vehicle sensor fusion apparatus according to an embodiment of the present disclosure.

Referring to FIG. 2, a fusion determination device 30 may include a point cloud determination device 31, an extraction device 32, a first fusion possible determination calculation device 33, a second fusion possible determination calculation device 34, and a fusion controller 35.

The point cloud determination device 31 may determine whether a point clustering result according to a sensing result of a radar sensor 10 of FIG. 1 is identical to a point clustering result according to a sensing result of a LiDAR sensor 20 of FIG. 1 and may activate or deactivate the extraction device 32 depending on whether the point clustering results are identical to each other.

In detail, the radar sensor 10 or the LiDAR sensor 20 may be a sensor which receives a radio wave or a laser reflected from an object and outputs a sensing result. The sensing result may be represented as points. At this time, sensing results output from the radar sensor 10 and the LiDAR sensor 20 may be represented in a form where points are clustered according to a shape of an object.

When the point clustering result (e.g., a location of a form where points are clustered) according to the sensing result obtained from the radar sensor 10 is identical to the point clustering result (e.g., a location of a form where points are clustered) according to the sensing result obtained from the LiDAR sensor 20, this may mean that the sensing result obtained from the radar sensor 10 and the sensing result obtained from the LiDAR sensor 20 are the results of sensing the same object.

The point cloud determination device 31 may be a component which determines the sensing result obtained from the radar sensor 10 and the sensing result obtained from the LiDAR sensor 20 are the results of sensing the same object. When the point clustering result according to the sensing result of the radar sensor 10 is identical to the point clustering result according to the sensing result of the LiDAR sensor 20, the point cloud determination device 31 may determine that the sensing results of the radar sensor 10 and the LiDAR sensor 20 are the results of sensing the same object.

As the point clustering result according to the sensing result of the radar sensor 10 is identical to the point clustering result according to the sensing result of the LiDAR sensor 20, when it is determined that the sensing results of the radar sensor 10 and the LiDAR sensor 20 are the results of sensing the same object, the point cloud determination device 31 may activate the extraction device 32.

As the point clustering result according to the sensing result of the radar sensor 10 is not identical to the point clustering result according to the sensing result of the LiDAR sensor 20, when it is not determined that the sensing results of the radar sensor 10 and the LiDAR sensor 20 are the results of sensing the same object, the point cloud determination device 31 may deactivate the extraction device 32.

When the extraction device 32 is activated by the point cloud determination device 31, it may extract points of predetermined locations from points included in the sensing result of each of the radar sensor 10 and the LiDAR sensor 20.

For example, when the extraction device 32 is activated by the point cloud determination device 31, it may extract points located at predetermined locations (e.g., three places) from the points included in the sensing result of the radar sensor 10.

Furthermore, when the extraction device 32 is activated by the point cloud determination device 31, it may extract points located at predetermined locations (e.g., three places) from the points included in the sensing result of the LiDAR sensor 20.

In detail, the extraction device 32 may extract a rightmost point with respect to a width of a host vehicle, may extract a leftmost point with respect to the width of the host vehicle, and may extract a point of a location closest to the host vehicle in a range of less than the width of the host vehicle, from the points included in the sensing result of the radar sensor 10.

Furthermore, the extraction device 32 may extract a rightmost point with respect to the width of the host vehicle, may extract a leftmost point with respect to the width of the host vehicle, and may extract a point of a location closest to the host vehicle in a range of less than the width of the host vehicle, from the points included in the sensing result of the LiDAR sensor 20.

The extraction device 32 may provide the first fusion possible determination calculation device 33 and the second fusion possible determination calculation device 34 with information about points at predetermined locations (e.g., three places), which are extracted from the sensing result of each of the radar sensor 10 and the LiDAR sensor 20, The first fusion possible determination calculation device 33 may determine whether the information about the extracted points at the predetermined locations, which is provided from the extraction device 32, meets a first fusion condition.

For example, the first fusion possible determination calculation device 33 may calculate distances between matched points among the points at the predetermined locations, which are extracted from the sensing result of the radar sensor 10, and the points at the predetermined locations, which are extracted from the sensing result of the LiDAR sensor 20, and may determine that the first fusion condition is met when the sum of the calculated distances is less than a predetermined distance threshold.

In detail, the first fusion possible determination calculation device 33 may calculate a distance between a rightmost point in the width of the host vehicle in the sensing result of the radar sensor 10 and a rightmost point in the width of the host vehicle in the sensing result of the LiDAR sensor 20.

The first fusion possible determination calculation device 33 may calculate a distance between a leftmost point in the width of the host vehicle in the sensing result of the radar sensor 10 and a leftmost point in the width of the host vehicle in the sensing result of the LiDAR sensor 20.

The first fusion possible determination calculation device 33 may calculate a distance between a point located at a distance closest to the host vehicle within the width of the host vehicle in the sensing result of the radar sensor 10 and a point located at a distance closest to the host vehicle within the width of the host vehicle in the sensing result of the LiDAR sensor 20.

When the result obtained by adding a distance between rightmost points with respect to the width of the host vehicle in the sensing result of each of the radar sensor 10 and the LiDAR sensor 20, a distance between leftmost points with respect to the width of host vehicle, and a distance between points located at a distance closest to the host vehicle is less than the predetermined distance threshold, the first fusion possible determination calculation device 33 may determine that the first fusion condition is met.

Furthermore, the first fusion possible determination calculation device 33 may assign a weight to each of the distances between the matched points and may determine that the first fusion condition is met when the sum of the distances to which the weights are assigned is less than the predetermined distance threshold.

Furthermore, the first fusion possible determination calculation device 33 may change the weight assigned to each of the distances between the points depending on a motion direction of an object.

In this case, because whether the condition is met is determined according to the distance between the matched points, the first fusion condition may be referred to as a distance condition.

When a difference between an inner angle of a shape estimated from the points of the predetermined locations of the radar sensor 10, which are extracted by the extraction device 32, and an inner angle of a shape estimated from the points of the predetermined locations of the LiDAR sensor 20, which are extracted by the extraction device 32, is less than the predetermined direction threshold, the second fusion possible determination calculation device 34 may determine that the second fusion condition is met.

Furthermore, the second fusion possible determination calculation device 34 may assign a weight to the difference between the inner angle of the shape estimated from the points of the predetermined locations of the radar sensor 10, which are extracted by the extraction device 32, and the inner angle of the shape estimated from the points of the predetermined locations of the LiDAR sensor 20, which are extracted by the extraction device 32, and may determine that the second fusion condition is met when a value of the difference between the inner angles to which the weight is assigned is less than the predetermined direction threshold.

In this case, because whether the condition is met is determined according to the value of the difference between the inner angles according to the shape estimated by the points extracted from the sensing result of each of the radar sensor 10 and the LiDAR sensor 20, the second fusion condition may be referred to as a direction angle condition.

The fusion controller 35 may generate fusion activation control information for activating the sensing result fusion device 40 or may generate fusion deactivation control information for deactivating the sensing result fusion device 40, based on the determined results of the first fusion possible determination calculation device 33 and the second fusion possible determination calculation device 34.

For example, when at least one of the determined results of the first and second fusion possible determination calculation device 33 and 34 meets a fusion condition, the fusion controller 35 may generate the fusion activation control information and may provide the sensing result fusion device 40 with the generated fusion activation control information.

For example, when both the determined results of the first and second fusion possible determination calculation device 33 and 34 do not meet the fusion condition, the fusion controller 35 may generate the fusion deactivation control information and may provide the sensing result fusion device 40 with the generated fusion deactivation control information.

In addition, the fusion controller 35 may provide the fusion controller 35 with reliability information indicating that fusion reliability is higher when both the determined results of the first and second fusion possible determination calculation device 33 and 34 meet the fusion condition than when only one of the determined results of the first and second fusion possible determination calculation device 33 and 34 meets the fusion condition.

Furthermore, the fusion controller 35 may determine that fusion reliability is high (e.g., that both the first and second fusion conditions are met), that the fusion reliability is normal (e.g., that one of the first and second fusion conditions is met), and that the fusion reliability is low (e.g., that both the first and second fusion conditions are not met), based on whether the first fusion condition is met according to the determined result of the first fusion possible determination calculation device 33 and whether the second fusion condition is met according to the determined result of the second fusion possible determination calculation device 34.

In this case, the fusion controller 35 may generate the fusion activation control information when the fusion reliability is high or normal and may generate the fusion deactivation control information when the fusion reliability is low.

Figure 3:
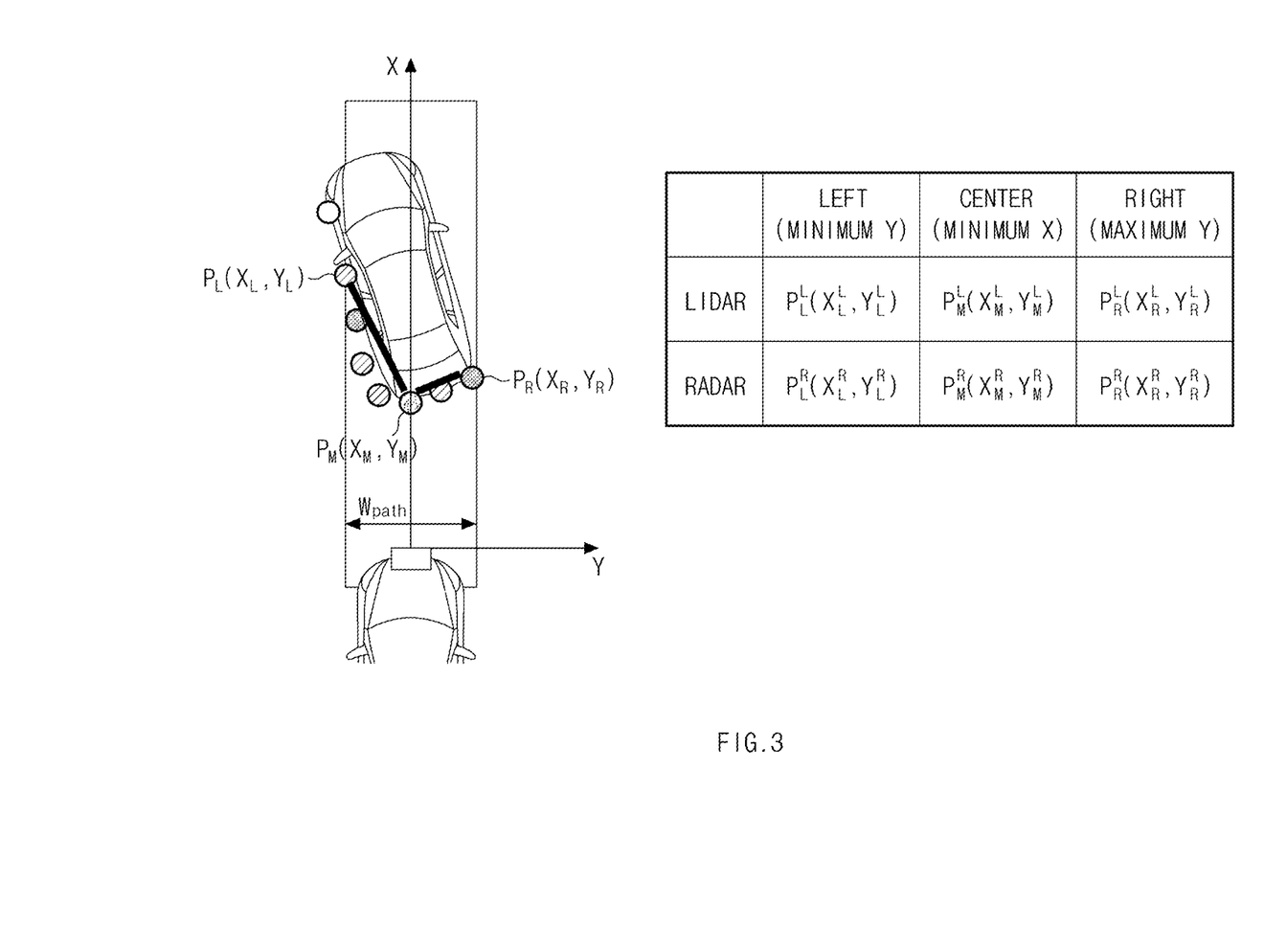
FIGS. 3 and 4 are drawings for describing a vehicle sensor fusion apparatus according to an embodiment of the present disclosure.
Figure 4:
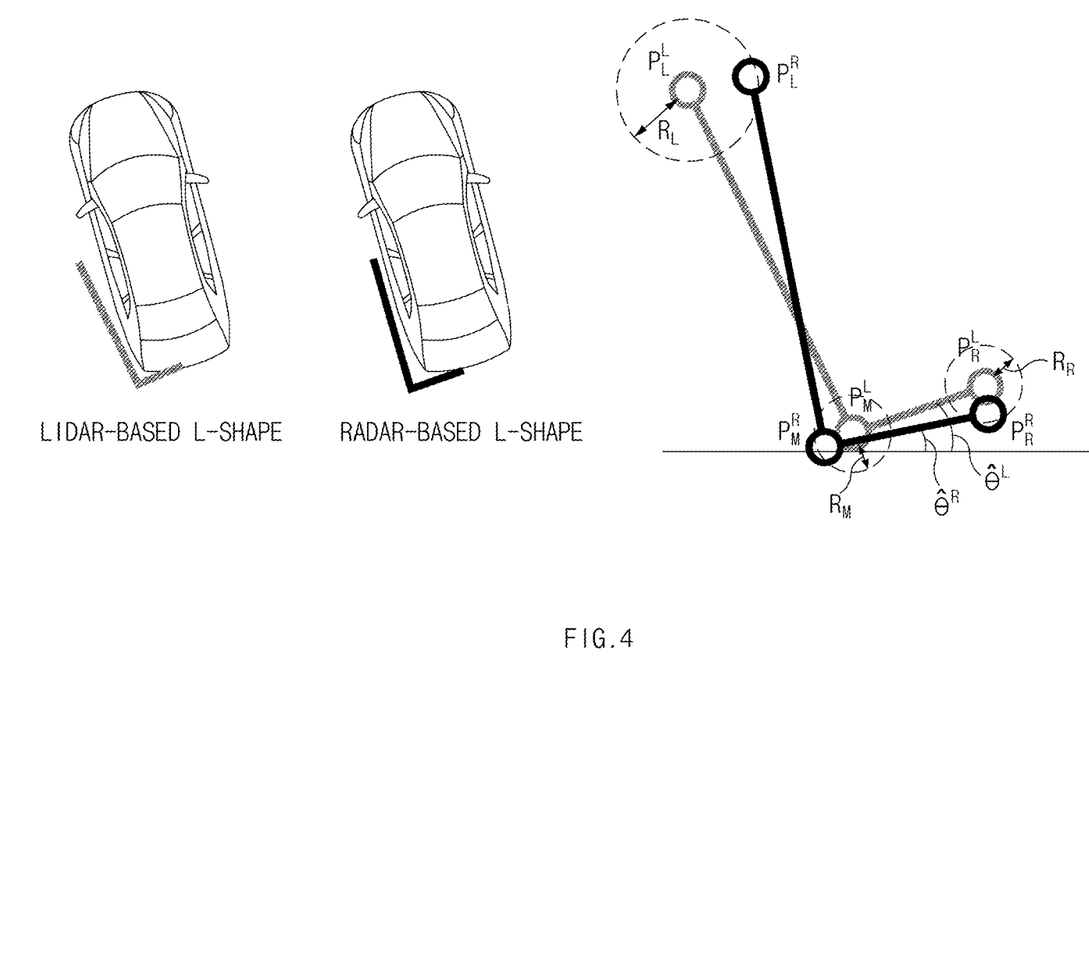

FIGS. 3 and 4 are drawings for describing a vehicle sensor fusion apparatus according to an embodiment of the present disclosure.

Particularly, FIG. 3 is a drawing for describing an operation of extracting points at predetermined locations (e.g., three places) from points included in the sensing results of the radar sensor 10 and the LiDAR sensor 20.

Referring to FIG. 3, an extraction device 32 of FIG. 2 may extract a leftmost point $P_L$ with respect to a width of a host vehicle from points included in the sensing result of each of the radar sensor 10 and the LiDAR sensor 20.

For example, the extraction device 32 may extract the point $P_L$, a Y-axis value of which is a minimum value, from points of a range within a width Wpath of the host vehicle in the sensing result of each of the radar sensor 10 and the LiDAR sensor 20.

Furthermore, the extraction device 32 may extract a rightmost point $P_R$ with respect to the width Wpath of the host vehicle from the points included in the sensing result of each of the radar sensor 10 and the LiDAR sensor 20.

For example, the extraction device 32 may extract the point $P_R$, a Y-axis value of which is a maximum value, from the points of the range within the width Wpath of the host vehicle in the sensing result of each of the radar sensor 10 and the LiDAR sensor 20.

Furthermore, the extraction device 32 may extract a point $P_M$ closest to the host vehicle in the range within the width Wpath of the host vehicle from the points included in the sensing result of each of the radar sensor 10 and the LiDAR sensor 20.

For example, the extraction device 32 may extract the point $P_M$, an X-axis value of which is a minimum value, from the points of the range within the width Wpath of the host vehicle in the sensing result of each of the radar sensor 10 and the LiDAR sensor 20.

As described above, the extraction device 32 may extract the three points $P_L$, $P_R$, and $P_M$ for each sensor from the sensing result of each of the radar sensor 10 and the LiDAR sensor 20.

In this case, FIG. 3 is illustrated to divide points extracted from the radar sensor 10 and the LiDAR sensor 20 as follows.

Referring to FIG. 3, three points extracted by the extraction device 32 from the sensing result of the radar sensor 10 are illustrated as $P_L^R$, $P_M^R$, and $P_R^R$, and three points $P_L^L$, $P_M^L$, and $P_R^L$ extracted by the extraction device 32 from the sensing result of the LiDAR sensor 20 are illustrated as $P_L^L$, $P_M^L$, and $P_R^L$.

In this case, a value of X- and Y-axis coordinates of the leftmost point $P_L^R$ among the extracted points of the radar sensor 10 may be illustrated as $X_L^R$, $Y_L^R$.

A value of X- and Y-axis coordinates of the rightmost point $P_R^R$ among the extracted points of the radar sensor 10 may be illustrated as $X_R^R$, $Y_R^R$.

A value of X- and Y-axis coordinates of the point $P_M^R$ closest to the host vehicle among the extracted points of the radar sensor 10 may be illustrated as $X_M^R$, $Y_M^R$.

A value of X- and Y-axis coordinates of the leftmost point $P_L^L$ among the extracted points of the LiDAR sensor 20 may be illustrated as $X_L^L$, $Y_L^L$.

A value of X- and Y-axis coordinates of the rightmost point $P_R^L$ among the extracted points of the LiDAR sensor 20 may be illustrated as $X_R^L$, $Y_R^L$.

A value of X- and Y-axis coordinates of the point $P_M^L$ closest to the host vehicle among the extracted points of the LiDAR sensor 20 may be illustrated as $X_M^L$, $Y_M^L$.

A description will be given of a first fusion condition of a first fusion possible determination calculation device 33 of FIG. 2 based on a coordinate value of points extracted by the extraction device 32 with reference to FIG. 3.

When the result obtained by adding a distance between rightmost points with respect to the width of the host vehicle in the sensing result of each of the radar sensor 10 and the LiDAR sensor 20, a distance between leftmost points with respect to the width of host vehicle, and a distance between points located at a distance closest to the host vehicle is less than a predetermined distance threshold, the fusion possible determination calculation device 33 may determine that the first fusion condition is met.

Furthermore, the first fusion possible determination calculation device 33 may assign a weight to each of distances between the matched points and may determine that the first fusion condition is met when the sum of the distances to which the weights are assigned is less than the predetermined distance threshold.

In this case, a distance between the leftmost points $P_L^R$ and $P_L^L$ with respect to the width Wpath of the host vehicle in the sensing result of each of the radar sensor 10 and the LiDAR sensor 20 may be calculated, and a value $C_L$ in which a weight $\alpha_L$ is assigned to the calculated distance may be calculated using a formula of $\alpha_L \sqrt{(X_L^L - X_L^R)^2 + (Y_L^L - Y_L^R)^2}$.

A distance between the rightmost points $P_R^R$ and $P_R^L$ with respect to the width Wpath of the host vehicle in the sensing result of each of the radar sensor 10 and the LiDAR sensor 20 may be calculated, and a value $C_R$ in which a weight $\alpha_R$ is assigned to the calculated distance may be calculated using a formula of $\alpha_R \sqrt{(X_R^L - X_R^R)^2 + (Y_R^L - Y_R^R)^2}$.

A distance between points $P_M^R$ and $P_M^L$ closest to the host vehicle in the sensing result of each of the radar sensor 10 and the LiDAR sensor 20 may be calculated, and a value $C_M$ in which a weight $\alpha_M$ is assigned to the calculated distance may be calculated using a formula of $\alpha_M \sqrt{(X_M^L - X_M^R)^2 + (Y_M^L - Y_M^R)^2}$.

When the value of $C_L + C_M + C_R$ is less than the predetermined distance threshold, the first fusion possible determination calculation device 33 may determine that the first fusion condition is met.

Furthermore, the first fusion possible determination calculation device 33 may change a weight assigned to each of the distances between the points depending on a motion direction of an object.

When an object (e.g., a preceding vehicle) moves in a left direction from the right of the host vehicle, that is, when the preceding vehicle cuts in from the right, the first fusion possible determination calculation device 33 may change a value of $\alpha_L$, among weights of $\alpha_L$, $\alpha_R$, and $\alpha_M$ to the largest value.

Meanwhile, when the object moves in a right direction from the left of the host vehicle, that is, when the preceding vehicle cuts in from the left, the first fusion possible determination calculation device 33 may change a value of $\alpha_R$ among weights of $\alpha_L$, $\alpha_R$, and $\alpha_M$ to the largest value.

FIG. 4 is a diagram for describing an operation of the second fusion possible determination calculation device 34.

When a difference between points of an inner angle of a shape estimated from points of predetermined locations of a radar sensor 10 of FIG. 1, which are extracted by an extraction device 32 of FIG. 2, and an inner angle of a shape estimated from points of predetermined locations of a LiDAR sensor 20 of FIG. 1, which are extracted by the extraction device 32, is less than a predetermined direction threshold, the second fusion possible determination calculation device 34 may determine that a second fusion condition is met.

Furthermore, the second fusion possible determination calculation device 34 may assign a weight to the difference between the inner angle of the shape estimated from the points of the predetermined locations of the radar sensor 10, which are extracted by the extraction device 32, and the inner angle of the shape estimated from the points of the predetermined locations of the LiDAR sensor 20, which are extracted by the extraction device 32, and may determine that the second fusion condition is met when a value of the difference between the inner angles to which the weight is assigned is less than the predetermined direction threshold.

Referring to FIG. 4, three points extracted from the sensing result of each of the radar sensor 10 and the LiDAR sensor 20 may be illustrated in an L-shape.

An inner angle of the L-shape estimated based on the sensing result of the radar sensor 10 may be illustrated as and an inner angle of the L-shape estimated based on the sensing result of the LiDAR sensor 20 may be illustrated as $\hat{\theta}^L$.

A value of the inner angle $\hat{\theta}^R$ of the L-shape estimated based on the sensing result of the radar sensor 10 may be calculated by calculating a direction angle formed by the host vehicle and the object based on the sensing result provided from the radar sensor 10.

A value of the inner angle $\hat{\theta}^L$ of the L-shape estimated based on the sensing result of the LiDAR sensor 20 may be calculated by calculating a direction angle formed by the host vehicle and the object based on the sensing result provided from the LiDAR sensor 20.

Furthermore, the inner angle $\hat{\theta}^R$ of the L-shape estimated based on the sensing result of the radar sensor 10 and the inner angle $\hat{\theta}^L$ of the L-shape estimated based on the sensing result of the LiDAR sensor 20 may be calculated by coordinates of the extracted points.

In this case, formulas of calculating the inner angles of the radar sensor 10 and the LiDAR sensor 20 are the same as each other and are described with reference to FIG. 3 in which coordinates of points $P_L$, $P_R$, and $P_M$ making up the L-shape of each of the radar sensor 10 and the LiDAR sensor 20 are illustrated.

As shown in FIG. 3, a description will be given assuming that coordinates of $P_L$ are $X_L$, $Y_L$, that coordinates of $P_R$ are $X_R$, $Y_R$, and that coordinates of $P_M$ are $X_M$, $Y_M$.

When an X-axis distance between $P_L$ and $P_R$ is greater than or equal to a value obtained by multiplying a calculated distance between and by a value of sin 45, a smaller value between the calculated value of $$|\arctan\frac{Y_L - Y_M}{X_L - X_M}|$$

and the calculated value of $$|\arctan\frac{Y_R - Y_M}{X_R - X_M}|$$

may be calculated as an inner angle.

Meanwhile, when the X-axis distance between $P_L$ and $P_R$ is less than the value obtained by multiplying the calculated distance between $P_L$ and $P_R$ by the value of sin 45, a larger value between the calculated value of $$|\arctan\frac{Y_L - Y_M}{X_L - X_M}|$$

and the calculated value of $$|\arctan\frac{Y_R - Y_M}{X_R - X_M}|$$

may be calculated as an inner angle.

As described above, an inner angle $\hat{\theta}^R$ of the L-shape estimated based on the sensing result of the radar sensor 10 and an inner angle $\hat{\theta}^L$ of the L-shape estimated based on the sensing result of the LiDAR sensor 20 may be calculated.

The second fusion possible determination calculation device 34 may calculate a difference $\sqrt{(\hat{\theta}^L - \hat{\theta}^R)^2}$ between the inner angles $\hat{\theta}^R$ and $\hat{\theta}^L$ of the radar sensor 10 and the LiDAR sensor 20 and may assign a weight $\beta_H$ to the calculated value, thus determining that the second fusion condition is met when a value $\beta_H\sqrt{(\hat{\theta}^L - \hat{\theta}^R)^2}$ to which the weight is assigned is less than a predetermined direction threshold.

Figure 5:
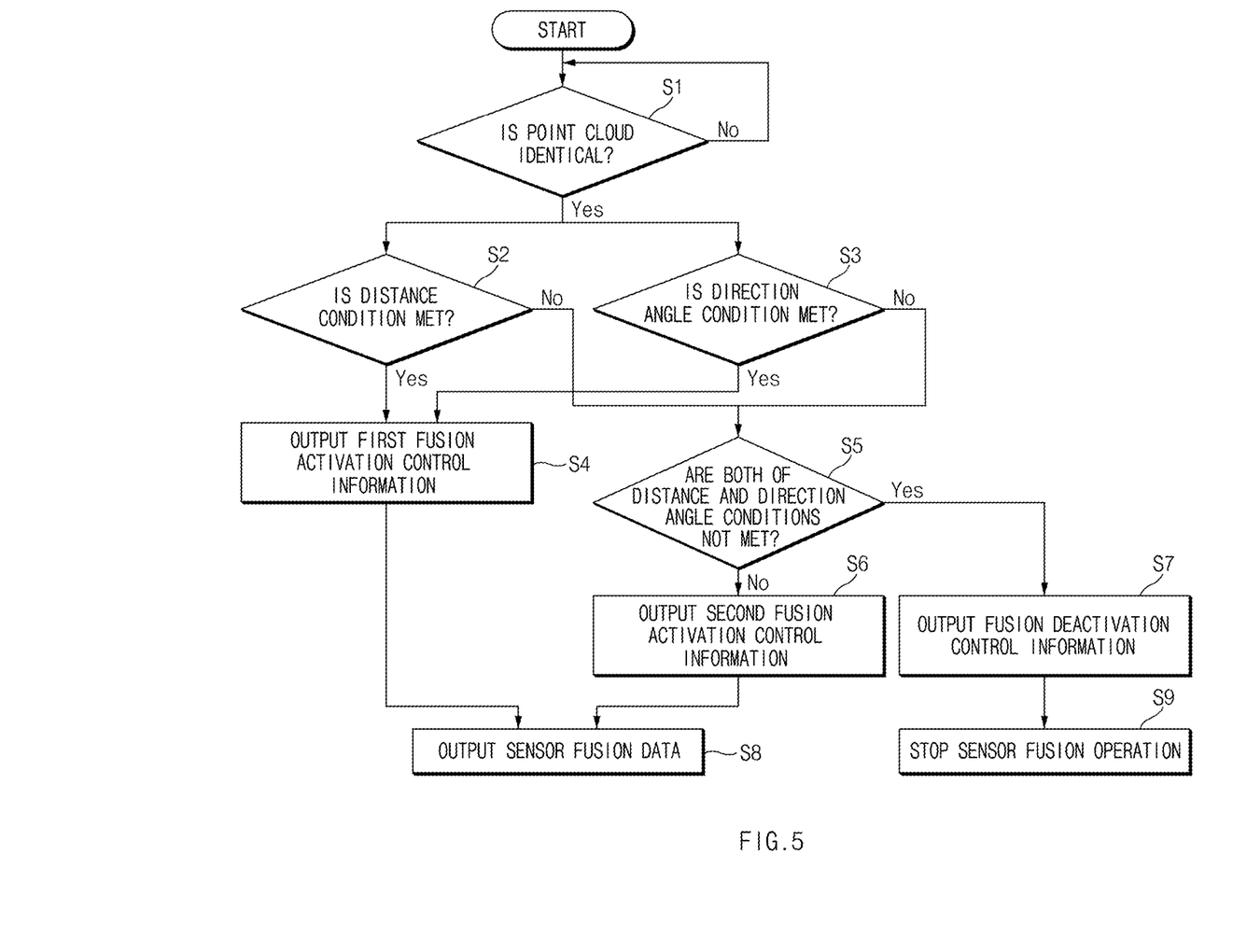
FIG. 5 is a flowchart for describing a sensor fusion method using a vehicle sensor fusion apparatus according to an embodiment of the present disclosure.

Various implementations of the apparatus, devices (e.g., fusion determination device), and fusion controller, described herein may be realized in digital electronic circuitry, integrated circuitry, a field programmable gate array (FPGA), an application specific integrated circuit (ASIC), computer hardware, firmware, software, and/or combinations thereof FIG. 5 is a flowchart for describing a sensor fusion method using a vehicle sensor fusion apparatus according to an embodiment of the present disclosure.

Referring to FIG. 5, the sensor fusion method using the vehicle sensor fusion apparatus according to an embodiment of the present disclosure may include determining (S1) a point cloud, determining (S2) a distance condition, determining (S3) a direction angle condition, outputting (S4) first fusion activation control information, determining (S5) whether the conditions are met, outputting (S6) second fusion activation control information, outputting (S7) fusion deactivation control information, outputting (S8) sensor fusion data, and ending (S9) a sensor fusion operation.

The determining (S1) of the point cloud may be an operation performed by a point cloud determination device 31 of FIG. 2, which may include determining whether a sensing result of a radar sensor 10 of FIG. 1 and a sensing result of a LiDAR sensor 20 of FIG. 1 are by the same object.

For example, the determining (S1) of the point cloud may include determining that the sensing result of the radar sensor 10 and the sensing result of the LiDAR sensor 20 are by the same object, when a clustered shape or location of points according to the sensing result of the radar sensor 10 and a clustered shape or location of points according to the sensing result of the LiDAR sensor 20 are identical to each other.

When it is determined that the sensing result of the radar sensor 10 and the sensing result of the LiDAR sensor 20 are by the same object (Yes) in the determining (S1) of the point cloud, the determining (S2) of the distance condition and the determining (S3) of the direction angle condition may be performed.

Meanwhile, when it is determined that the sensing result of the radar sensor 10 and the sensing result of the LiDAR sensor 20 are not by the same object in the determining (S1)

of the point cloud (No), the determining (S1) of the point cloud may be continuously performed until it is determined that the sensing result of the radar sensor 10 and the sensing result of the LiDAR sensor 20 are by the same object.

The determining (S2) of the distance condition may be an operation performed by an extraction device 32 and a first fusion possible determination calculation device 33 of FIG. 2, which may include extracting points located in predetermined locations from the sensing result of each of the radar sensor 10 and the LiDAR sensor 20, calculating a distance between points with the same extracted locations, and determining whether a first fusion condition is met based on the calculated distance value.

In this case, the points extracted from the predetermined locations may include a leftmost point with respect to a width of the host vehicle, a rightmost point with respect to the width of the host vehicle, and a point of a location closest to the host vehicle, in the sensing result of each of the radar sensor 10 and the LiDAR sensor 20.

The calculating of the distance between the points with the same located locations may include calculating a distance between leftmost points, a distance between rightmost points, and a distance between points of locations closest to the host vehicle, from the sensing result of each of the radar sensor 10 and the LiDAR sensor 20.

The determining of whether the first fusion condition is met based on the calculated distance value may include assigning a weight to each of the calculated distances and determining that the first fusion condition is met when the sum of the values to which the weights are assigned is less than a predetermined distance threshold.

The determining (S3) of the direction angle condition may be an operation performed by the extraction device 32 and a second fusion possible determination calculation device 34 of FIG. 2, which may include extracting points located at predetermined locations from the sensing result of each of the radar sensor 10 and the LiDAR sensor 20, calculating an inner angle of a shape estimated from the extracted points for each sensor, and determining whether a second fusion condition is met based on the calculated inner angle value for each sensor.

In this case, the points extracted from the predetermined locations may include a leftmost point with respect to the width of the host vehicle, a rightmost point with respect to the width of the host vehicle, and a point of a location closest to the host vehicle, in the sensing result of each of the radar sensor 10 and the LiDAR sensor 20. The estimated shape may be an L-shape around the point of the location closest to the host vehicle.

The determining of whether the second fusion condition is met based on the calculated inner angle value for each sensor may include determining that the second fusion condition is met when a value obtained by assigning a weight to a difference between the calculated inner angle values for each sensor is less than a predetermined direction threshold.

The outputting (S4) of the first fusion activation control information may be an operation performed by a fusion controller 35 of FIG. 2, which may include generating, by the fusion controller 35, fusion activation control information, when the first fusion condition (e.g., the distance condition) is met (Yes) in the determining (S2) of the distance condition and when the second fusion condition (e.g., the direction angle condition) is met (Yes) in the determining (S3) of the direction angle condition.

The determining (S5) of whether the conditions are met may be performed, when the distance condition is not met (No) in the determining (S2) of the distance condition or when the direction angle condition is not met (No) in the determining (S3) of the direction angle condition, that is, when at least one condition is not met in the determining (S2 and S3) of the two conditions.

The determining (S5) of whether the conditions are met may include determining whether both the conditions are not met in the determining (S3) of the distance condition and the determining (S4) of the direction angle condition.

When it is determined that all the both conditions are met in the determining (S3) of the distance condition and the determining (S4) of the direction angle condition in the determining (S5) of whether the conditions are met, that is, when it is determined that only one condition is met (No) in the determining (S3) of the distance condition and the determining (S4) of the direction angle condition, the outputting (S6) of the second fusion activation control information may be performed.

Meanwhile, when it is determined that both the conditions are not met (Yes) in the determining (S3) of the distance condition and the determining (S4) of the direction angle condition in the determining (S5) of whether the conditions are met, the outputting (S7) of the fusion deactivation control information may be performed.

The outputting (S6) of the second fusion activation control information may be an operation performed by the fusion controller 35, which may include generating, by the fusion controller 35, fusion activation control information, when only one condition is met in the determining (S2) of the distance condition and the determining (S3) of the direction angle condition.

The outputting (S7) of the fusion deactivation control information may be an operation performed by the fusion controller 35, which may include generating, by the fusion controller 35, fusion deactivation control information, when both the conditions are not met in the determining (S2) of the distance condition and the determining (S3) of the direction angle condition.

The outputting (S8) of the sensor fusion data may be an operation performed by a sensing result fusion device 40 of FIG. 1, which may be an operation performed after one of the outputting (S4) of the first fusion activation control information or the outputting (S6) of the second fusion activation control information is performed.

For example, the outputting (S8) of the sensor fusion data may include fusing, by the activated sensing result fusion device 40, a sensing result of the radar sensor 10 with a sensing result of the LiDAR sensor 20 and outputting, by the activated sensing result fusion device 40, the fused information.

The ending (S9) of the sensor fusion operation may be an operation performed after the outputting (S7) of the fusion deactivation control information is performed, which may include deactivating the sensor result fusion device 40.

As described above, the vehicle sensor fusion apparatus and the method thereof according to an embodiment of the present disclosure may extract points from predetermined locations in the sensing result of each of sensors, the sensing result of which is indicated in a point cloud-based form, for example, the radar sensor 10 and the LiDAR sensor 20 and may determine whether it is possible to fuse the sensing results sensed by the sensors based on a distance and an inner angle according to the locations of the extracted points.

For example, the vehicle sensor fusion apparatus and the method thereof according to an embodiment of the present disclosure may determine whether the first fusion condition is met based on a distance according to the locations of the extracted points, may determine whether the second fusion condition is met based on an inner angle according to the locations of the extracted points, and may fuse and output the sensing results when at least one of the first fusion condition or the second fusion condition is met, thus improving the reliability of the pieces of fused information.

In addition, the vehicle sensor fusion apparatus and the method thereof according to an embodiment of the present disclosure may notify another component (e.g., another device) of information fused with higher reliability when the first and second fusion conditions are met than when only one of the first and second fusion conditions is met. Thus, when determining an object using the fused information, the vehicle sensor fusion apparatus and the method thereof according to an embodiment of the present disclosure may even estimate the reliability of determining the object.

The present technology may fuse sensing results obtained from a plurality of sensors which output point cloud-based sensing results to obtain accurate object information with respect to rapid deceleration, acceleration, or turn of an object and may identifying an accurate shape and direction of the object even in complicated urban autonomous driving to improve the safety of autonomous driving.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A vehicle sensor fusion apparatus, comprising:
   a plurality of sensors to output point cloud-based sensing results;
   a fusion determination device configured to determine whether it is possible to fuse the sensing results based on the sensing results; and
   a sensing result fusion device configured to fuse the sensing results and output the fused sensing results, when it is determined that it is possible to fuse the sensing results,
   wherein the fusion determination device extracts points located at predetermined locations from points included in sensing result of each of the plurality of sensors and determines whether it is possible to fuse the sensing results based on coordinates of the extracted points, and
   wherein the fusion determination device calculates distances between the extracted points and inner angles of a shape estimated by the extracted points based on the coordinates of the extracted points, determines whether a first fusion condition is met based on the calculated distances, and determines whether a second fusion condition is met based on the calculated inner angles.

2. The vehicle sensor fusion apparatus of claim 1, wherein the fusion determination device determines that it is possible to fuse the sensing results, when it is determined that at least one of the first fusion condition and the second fusion condition is met.

3. The vehicle sensor fusion apparatus of claim 1, wherein the fusion determination device determines that it is impossible to fuse the sensing results, when it is determined that both the first fusion condition and the second fusion condition are not met.

4. The vehicle sensor fusion apparatus of claim 1, wherein the fusion determination device includes:
   a point cloud determination device configured to determine whether the sensing results are results of sensing the same object;
   an extraction device configured to extract a leftmost point with respect to a width of a host vehicle, a rightmost point with respect to the width of the host vehicle, and a point of a location closest to the host vehicle from the points included in the sensing results, when the sensing results are the results of sensing the same object;
   a first fusion possible determination calculation device configured to calculate distances between the points extracted by the extraction device and determine whether the first fusion condition is met based on the calculated distances;
   a second fusion possible determination calculation device configured to calculate inner angles of a shape estimated by the points extracted by the extraction device and determine whether the second fusion condition is met based on the calculated inner angles; and
   a fusion controller configured to determine whether it is impossible to fuse the sensing results, whether the first fusion condition is met and whether the second fusion condition is met.

5. The vehicle sensor fusion apparatus of claim 4, wherein the first fusion possible determination calculation device calculates the distances between the points extracted by the extraction device, assigns weights to the calculated distances, and determines that the first fusion condition is met, when a sum of the calculated distances to which the weights are assigned is less than a predetermined distance threshold.

6. The vehicle sensor fusion apparatus of claim 5, wherein the first fusion possible determination calculation device changes the weights depending on a direction of motion of the same object, when assigning the weights to the calculated distances.

7. The vehicle sensor fusion apparatus of claim 4, wherein the second fusion possible determination calculation device calculates inner angles of an L-shape based on coordinates of the points extracted by the extraction device, when the shape estimated from the points extracted by the extraction device is the L-shape, assigns a weight to a difference between the calculated inner angles, and determines that the second fusion condition is met, when the difference to which the weight is assigned is less than a predetermined direction angle threshold.

8. A vehicle sensor fusion method, comprising:
   determining, by a point cloud determination device, whether a sensing result of a radar sensor and a sensing result of a light detection and ranging (LiDAR) sensor are results of sensing the same object;
   extracting, by an extraction device, points of predetermined locations from the sensing result of the radar sensor and the sensing result of the LiDAR sensor, when it is determined that the sensing result of the radar sensor and the sensing result of the LiDAR sensor are the results of sensing the same object;

determining, by a first fusion possible determination calculation device, whether a first fusion condition is met based on the points extracted from each of the sensing results of the radar sensor and the LiDAR sensor;

determining, by a second fusion possible determination calculation device, whether a second fusion condition is met based on the points extracted from each of the sensing results of the radar sensor and the LiDAR sensor; and determining, by a fusion controller, whether to fuse the sensing result of the radar sensor with the sensing result of the LiDAR sensor based on whether the first and second fusion conditions are met.

9. The vehicle sensor fusion method of claim 8, wherein the extracting of the points includes:

extracting, by the extraction device, a leftmost point with respect to a width of a host vehicle, a rightmost point with respect to the width of the host vehicle, and a point located at a location closest to the host vehicle from the sensing result of the radar sensor; and extracting, by the extraction device, a leftmost point with respect to the width of a host vehicle, a rightmost point with respect to the width of the host vehicle, and a point located at a location closest to the host vehicle from the sensing result of the LiDAR sensor.

10. The vehicle sensor fusion method of claim 9, wherein the determining of whether the first fusion condition is met includes:

calculating, by the first fusion possible determination calculation device, a distance between the leftmost point with respect to the width of the host vehicle in the sensing result of the radar sensor and the leftmost point with respect to the width of the host vehicle in the sensing result of the LiDAR sensor and assigning a first weight to the calculated distance;

calculating, by the first fusion possible determination calculation device, a distance between the rightmost point with respect to the width of the host vehicle in the sensing result of the radar sensor and the rightmost point with respect to the width of the host vehicle in the sensing result of the LiDAR sensor and assigning a second weight to the calculated distance;

calculating, by the first fusion possible determination calculation device, a distance between the point located at the location closest to the host vehicle in the sensing result of the radar sensor and the point located at the location closest to the host vehicle in the sensing result of the LiDAR sensor and assigning a third weight to the calculated distance; and determining that the first fusion condition is met, when a sum of the calculated distances to which the first to third weights are assigned is less than a predetermined distance threshold.

11. The vehicle sensor fusion method of claim 10, wherein the determining of whether the first fusion condition is met further includes:

changing, by the first fusion possible determination calculation device, one of the first to third weights based on a movement direction of the same object.

12. The vehicle sensor fusion method of claim 11, wherein the changing of the one of the first to third weights is to change the first weight among the first to third weights to the largest value, when the same object moves from the right to the left with respect to the host vehicle.

13. The vehicle sensor fusion method of claim 11, wherein the changing of the one of the first to third weights is to change the second weight among the first to third weights to the largest value, when the same object moves from the left to the right with respect to the host vehicle.

14. The vehicle sensor fusion method of claim 9, wherein the determining of whether the second fusion condition is met includes:

calculating, by the second fusion possible determination calculation device, an inner angle of an L-shape estimated from the leftmost point, the rightmost point, and the point located at the location closest to the host vehicle, the points being extracted from the sensing result of the radar sensor;

calculating, by the second fusion possible determination calculation device, an inner angle of an L-shape estimated from the leftmost point, the rightmost point, and the point located at the location closest to the host vehicle, the points being extracted from the sensing result of the LiDAR sensor; and assigning a weight to a difference between the inner angle calculated from the sensing result of the radar sensor and the inner angle calculated from the sensing result of the LiDAR sensor and determining that the second fusion condition is met when the difference to which the weight is assigned is less than a predetermined direction angle threshold.

15. The vehicle sensor fusion method of claim 8, wherein the determining of whether to fuse the sensing result of the radar sensor with the sensing result of the LiDAR sensor includes:

fusing, by the fusion controller, the sensing result of the radar sensor with the sensing result of the LiDAR sensor, when it is determined that at least one of the first fusion condition and the second fusion condition is met.

* * * * *